US009651386B2

United States Patent
Park

(10) Patent No.: US 9,651,386 B2
(45) Date of Patent: May 16, 2017

(54) APPARATUS AND METHOD FOR CALCULATING DISTANCE BETWEEN VEHICLES

(71) Applicant: MANDO CORPORATION, Pyeongtaek-si (KR)

(72) Inventor: Man-Bok Park, Seoul (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 275 days.

(21) Appl. No.: 14/022,153

(22) Filed: Sep. 9, 2013

(65) Prior Publication Data
US 2015/0073704 A1    Mar. 12, 2015

(30) Foreign Application Priority Data

Sep. 7, 2013    (KR) .................. 10-2012-0099462

(51) Int. Cl.
| G01C 21/00 | (2006.01) |
| G01C 21/26 | (2006.01) |
| G08G 1/16  | (2006.01) |

(52) U.S. Cl.
CPC .............. *G01C 21/26* (2013.01); *G08G 1/163* (2013.01)

(58) Field of Classification Search
CPC ...... G01C 21/26; G01C 21/20; G01C 21/165; G01C 21/28; G01S 19/49; G01S 19/47; G01S 19/26
USPC .......................... 701/409, 412, 461, 468, 472
See application file for complete search history.

(56) References Cited

U.S. PATENT DOCUMENTS

| 8,027,645 | B2* | 9/2011 | Haghighi et al. ................ 455/75 |
| 8,265,817 | B2* | 9/2012 | Tener et al. ....................... 701/23 |
| 8,374,785 | B2* | 2/2013 | McBurney et al. ........... 701/472 |
| 2008/0027645 | A1 | 1/2008 | Okada et al. |
| 2010/0030471 | A1* | 2/2010 | Watanabe et al. ............. 701/217 |

FOREIGN PATENT DOCUMENTS

JP    2009-300457 A    12/2009

OTHER PUBLICATIONS

Korean Office Action issued in Korean Application No. 10-2012-0099462 dated Feb. 28, 2014.

* cited by examiner

*Primary Examiner* — James Trammell
*Assistant Examiner* — Majdi Alsomiri
(74) *Attorney, Agent, or Firm* — McDermott Will & Emery LLP

(57) ABSTRACT

An apparatus and method for calculating a distance between vehicles to receive position movement information of a subject vehicle and position movement information of an object vehicle from a global positioning system and calculate a distance between the moved subject vehicle and the moved object vehicle based on a position movement distance of the subject vehicle and a position movement distance of the object vehicle at predetermined time as the sum of a vector when calculating the position movement information of the subject vehicle and the position movement information of the object vehicle over time using a dead reckoning formula.

6 Claims, 6 Drawing Sheets

APPARATUS AND METHOD FOR CALCULATING DISTANCE BETWEEN VEHICLES

CROSS-REFERENCE TO RELATED APPLICATION

This application claims the benefit of Korean Patent Application No. 2012-0099462, filed on Sep. 7, 2012 in the Korean Intellectual Property Office, the disclosure of which is incorporated herein by reference.

BACKGROUND

1. Field

Embodiments of the present invention relate to an apparatus and method for calculating a distance between vehicles.

2. Description of the Related Art

Generally, a conventional apparatus for calculating a distance between vehicles is configured to receive position movement information of a subject vehicle and position movement information of an object vehicle from a global positioning system and to calculate the distance between the subject vehicle and the object vehicle.

In the conventional apparatus, however, reduction of an error rate is limited when calculating the distance between the subject vehicle and the object vehicle. As a result, prevention of collision between the subject vehicle and the object vehicle is limited.

In recent years, research has been continuously conducted into improved apparatuses and methods for calculating a distance between vehicles that reduce an error rate when calculating a distance between a subject vehicle and an object vehicle, thereby preventing collision between the subject vehicle and the object vehicle.

SUMMARY

It is an aspect of the present invention to provide an apparatus and method for calculating a distance between vehicles that reduce an error rate when calculating a distance between a subject vehicle and an object vehicle, thereby preventing collision between the subject vehicle and the object vehicle.

Additional aspects of the invention will be set forth in part in the description which follows and, in part, will be obvious from the description, or may be learned by practice of the invention.

In accordance with an aspect of the present invention, an apparatus for calculating a distance between vehicles receives position movement information of a subject vehicle and position movement information of an object vehicle from a global positioning system and calculates a distance between the moved subject vehicle and the moved object vehicle based on a position movement distance of the subject vehicle and a position movement distance of the object vehicle at predetermined time as the sum of a vector when calculating the position movement information of the subject vehicle and the position movement information of the object vehicle over time using a dead reckoning formula comprising Equation 1 and Equation 2.

$$\theta = \theta_0 + \int \dot{\theta} dt \qquad \langle\text{Equation 1}\rangle$$

$$x = x_0 + \int \left(V_x \frac{1}{2}\cos\theta - V_y\sin\theta\right) dt$$

$$y = y_0 + \int \left(V_x \frac{1}{2}\sin\theta + V_y\cos\theta\right) dt$$

where, $\theta_0$ is a yaw rate value at previous time, $\dot{\theta}$ is a yaw rate value at present time, $\theta$ is a yaw rate value at time at which the vehicles have been moved, $x_0$ and $y_0$ are position coordinate values at previous time, and x and y are position coordinate values at time at which the vehicles have been moved.

$$\overline{\text{Dist\_2\_Veh}} = -\overline{\text{Dist\_Sub\_Veh}} + \overline{\text{Dist\_2\_GPS}} + \overline{\text{Dist\_Obj\_Veh}} \qquad \langle\text{Equation 2}\rangle$$

where, $-\overline{\text{Dist\_Sub\_Veh}}$ is a position movement distance of the subject vehicle, $\overline{\text{Dist\_2\_GPS}}$ is a distance between the subject vehicle and the object vehicle at previous time, $\overline{\text{Dist\_Obj\_Veh}}$ is a position movement distance of the object vehicle, and $\overline{\text{Dist\_2\_Veh}}$ is a distance between the moved subject vehicle and the moved object vehicle.

When calculating the position movement information of the subject vehicle and the position movement information of the object vehicle, the apparatus may calculate the distance between the moved subject vehicle and the moved object vehicle based on the position movement distance of the subject vehicle and the position movement distance of the object vehicle at the predetermined time as the sum of a vector using present horizontal velocity values and present vertical velocity values, present yaw rate values, and present heading angle values sensed by yaw rate sensors, heading angle sensors, and velocity sensors of the subject vehicle and the object vehicle.

In accordance with another aspect of the present invention, a method for calculating a distance between vehicles includes receiving position movement information of a subject vehicle and position movement information of an object vehicle from a global positioning system, executing a predetermined dead reckoning formula comprising Equation 1 and Equation 2 to calculate the position movement information of the subject vehicle and the position movement information of the object vehicle, and calculating a distance between the moved subject vehicle and the moved object vehicle based on a position movement distance of the subject vehicle and a position movement distance of the object vehicle at predetermined time as the sum of a vector when calculating the position movement information of the subject vehicle and the position movement information of the object vehicle over time using the dead reckoning formula.

$$\theta = \theta_0 + \int \dot{\theta} dt \qquad \langle\text{Equation 1}\rangle$$

$$x = x_0 + \int \left(V_x \frac{1}{2}\cos\theta - V_y\sin\theta\right) dt$$

$$y = y_0 + \int \left(V_x \frac{1}{2}\sin\theta + V_y\cos\theta\right) dt$$

where, $\theta_0$ is a yaw rate value at previous time, $\dot{\theta}$ is a yaw rate value at present time, $\theta$ is a yaw rate value at time at which the vehicles have been moved, $x_0$ and $y_0$ are position coordinate values at previous time, and x and y are position $$\theta = \theta_0 + \int \dot{\theta} dt \qquad \langle\text{Equation 1}\rangle$$

coordinate values at time at which the vehicles have been moved.

$$\overline{Dist\_2\_Veh} = -\overline{Dist\_Sub\_Veh} + \overline{Dist\_2\_GPS} + \overline{Dist\_Obj\_Veh}$$ <Equation 2> where, $-\overline{Dist\_Sub\_Veh}$ is a position movement distance of the subject vehicle, $\overline{Dist\_2\_GPS}$ is a distance between the subject vehicle and the object vehicle at previous time, $\overline{Dist\_Obj\_Veh}$ is a position movement distance of the object vehicle, and $\overline{Dist\_2\_Veh}$ is a distance between the moved subject vehicle and the moved object vehicle.

The calculating the distance between the moved subject vehicle and the moved object vehicle may include calculating the distance between the moved subject vehicle and the moved object vehicle based on the position movement distance of the subject vehicle and the position movement distance of the object vehicle at the predetermined time as the sum of a vector using present horizontal velocity values and present vertical velocity values, present yaw rate values, and present heading angle values sensed by yaw rate sensors, heading angle sensors, and velocity sensors of the subject vehicle and the object vehicle.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
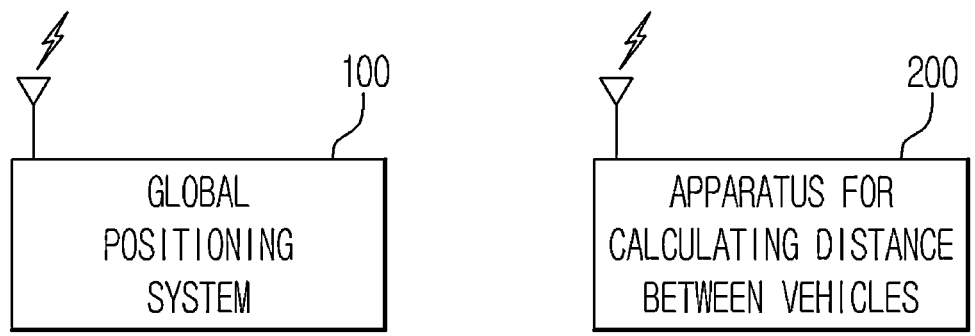
FIG. 1 is a block diagram showing an apparatus for calculating a distance between vehicles according to an embodiment of the present invention.

Reference will now be made in detail to the embodiments of the present invention, examples of which are illustrated in the accompanying drawings, wherein like reference numerals refer to like elements throughout.

Figure 2:
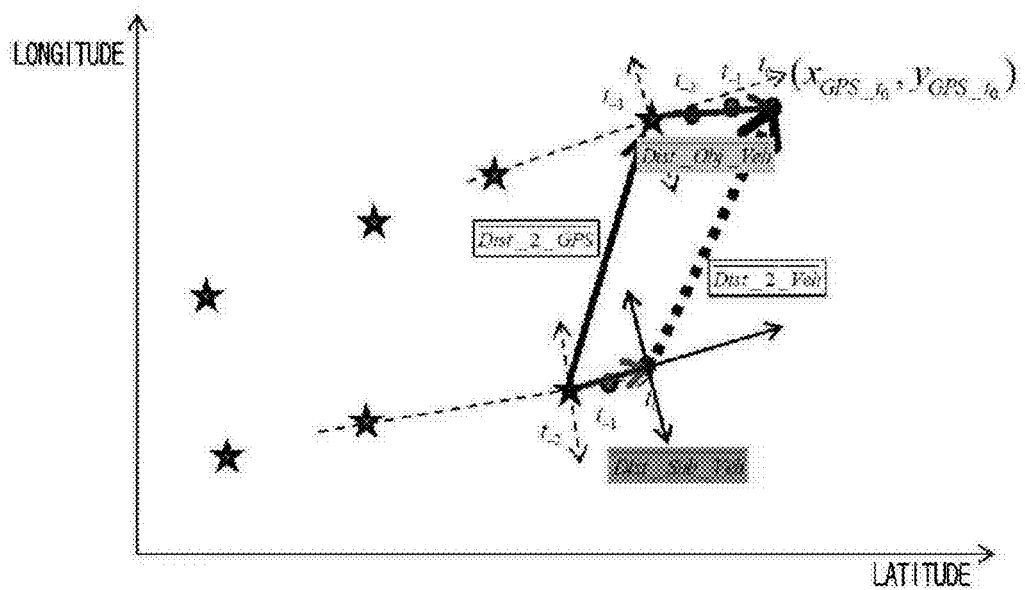
FIG. 2 is a graph showing a distance between a moved subject vehicle and a moved object vehicle based on position movement distances of the subject vehicle and the object vehicle at time $t_0$.

FIG. 1 is a block diagram showing an apparatus for calculating a distance between vehicles according to an embodiment of the present invention and FIG. 2 is a graph showing a distance between a moved subject vehicle and a moved object vehicle based on position movement distances of the subject vehicle and the object vehicle at time $t_0$.

Figure 3:
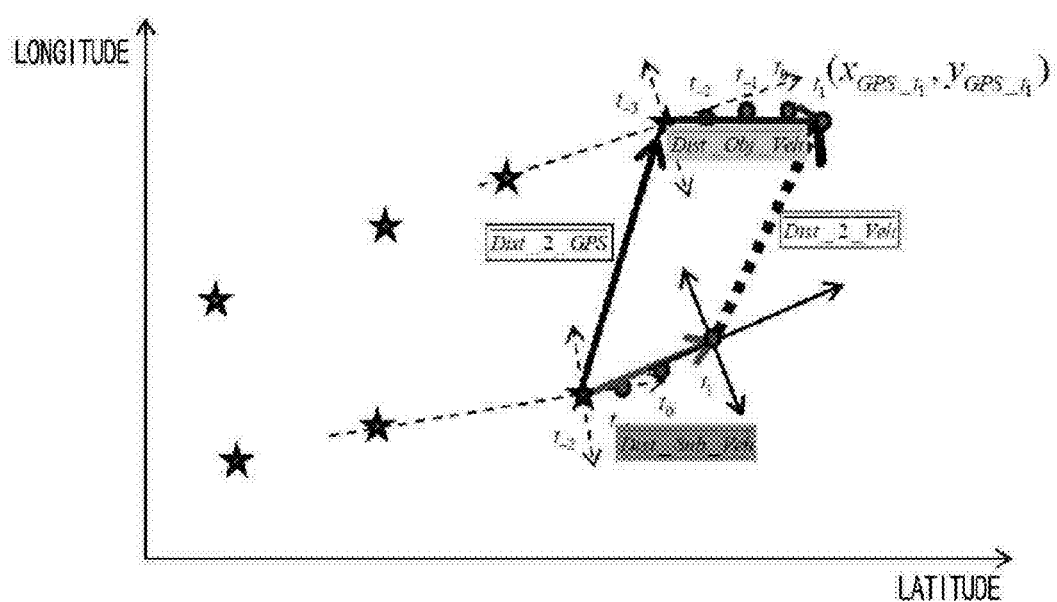
FIG. 3 is a graph showing a distance between the moved subject vehicle and the moved object vehicle based on position movement distances of the subject vehicle and the object vehicle at time $t_1$.
Figure 4:
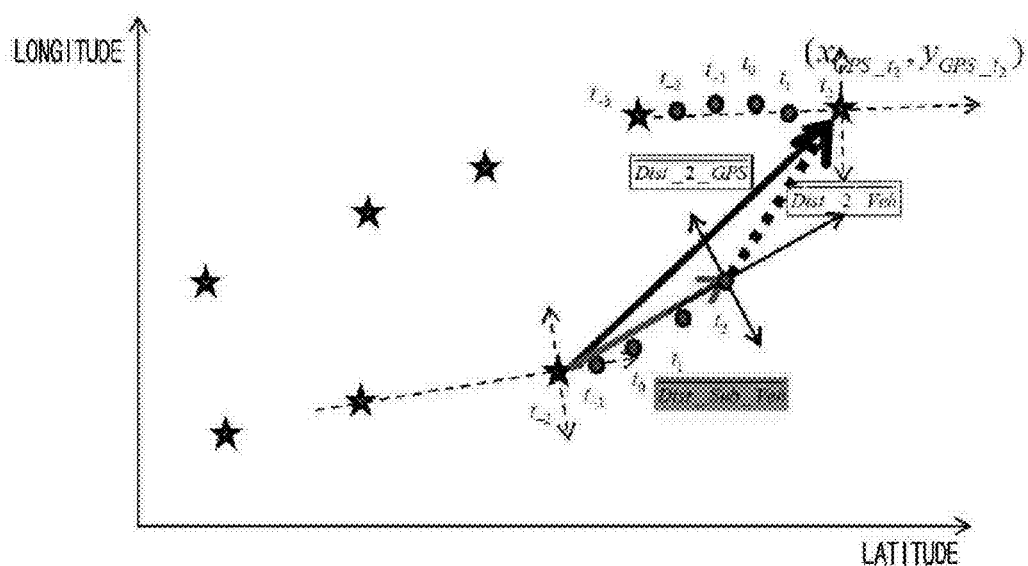
FIG. 4 is a graph showing a distance between the moved subject vehicle and the moved object vehicle based on position movement distances of the subject vehicle and the object vehicle at time $t_2$.

FIG. 3 is a graph showing a distance between the moved subject vehicle and the moved object vehicle based on position movement distances of the subject vehicle and the object vehicle at time $t_1$ and FIG. 4 is a graph showing a distance between the moved subject vehicle and the moved object vehicle based on position movement distances of the subject vehicle and the object vehicle at time $t_2$.

Figure 5:
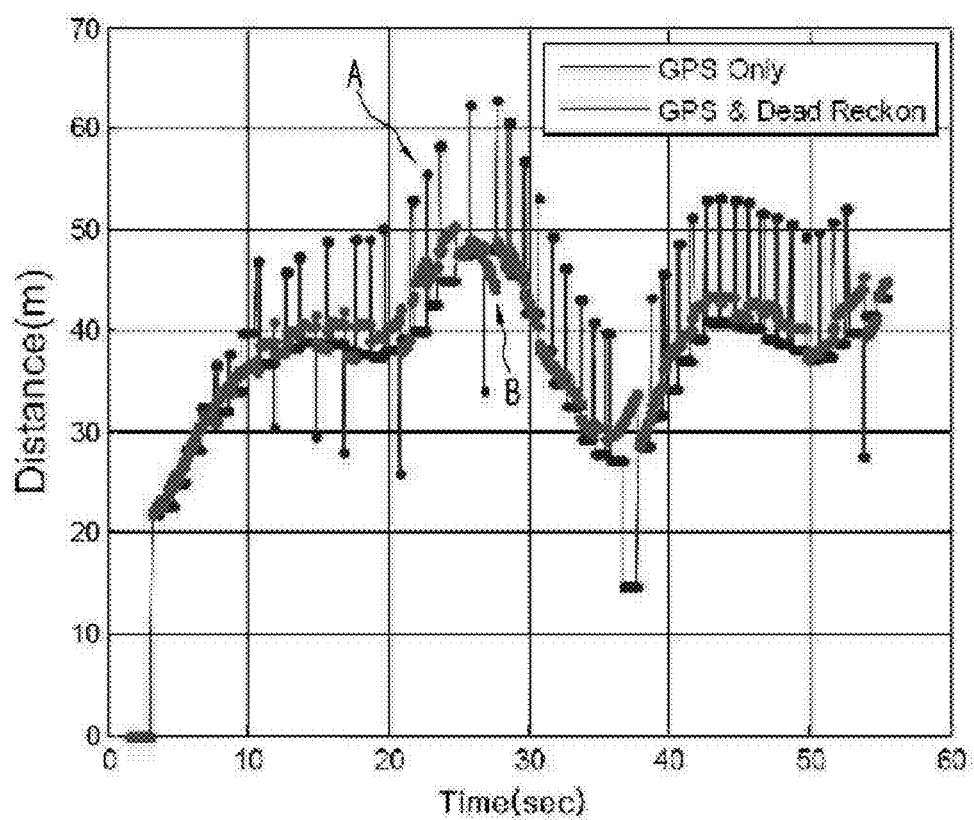
FIG. 5 is a characteristic graph when a distance between vehicles is calculated using a global positioning system of FIG. 1 and a characteristic graph when a distance between vehicles is calculated using the global positioning system and a dead reckoning formula.

FIG. 5 is a characteristic graph when a distance between vehicles is calculated using a global positioning system of FIG. 1 and a characteristic graph when a distance between vehicles is calculated using the global positioning system and a dead reckoning formula.

Referring to FIGS. 1 to 5, an apparatus 200 for calculating a distance between vehicles according to an embodiment of the present invention is provided to receive position movement information of a subject vehicle and position movement information of an object vehicle from a global positioning system 100 and calculate a distance $\overline{Dist\_2\_Veh}$ between the moved subject vehicle and the moved object vehicle based on a position movement distance $\overline{Dist\_Sub\_Veh}$ of the subject vehicle and a position movement distance $\overline{Dist\_Obj\_Veh}$ of the object vehicle at predetermined time $t_{-3}$, $t_{-2}$, $t_{-1}$, $t_0$, $t_1$, and $t_2$ as the sum of a vector when calculating the position movement information of the subject vehicle and the position movement information of the object vehicle over time using a dead reckoning formula including Equation 1 and Equation 2.

$$\theta = \theta_0 + \int \dot{\theta} dt$$ <Equation 1>

$$x = x_0 + \int \left(V_x \frac{1}{2}\cos\theta - V_y\sin\theta\right) dt$$

$$y = y_0 + \int \left(V_x \frac{1}{2}\sin\theta + V_y\cos\theta\right) dt$$

where, $\theta_0$ is a yaw rate value at previous time, $\dot{\theta}$ is a yaw rate value at present time, $\theta$ is a yaw rate value at time at which the vehicles have been moved, $x_0$ and $y_0$ are position coordinate values at previous time, and x and y are position coordinate values at time at which the vehicles have been moved.

$$\overline{Dist\_2\_Veh} = -\overline{Dist\_Sub\_Veh} + \overline{Dist\_2\_GPS} + \overline{Dist\_Obj\_Veh}$$ <Equation 2> where, $-\overline{Dist\_Sub\_Veh}$ is a position movement distance of the subject vehicle, $\overline{Dist\_2\_GPS}$ is a distance between the subject vehicle and the object vehicle at previous time, $\overline{Dist\_Obj\_Veh}$ is a position movement distance of the object vehicle, and $\overline{Dist\_2\_Veh}$ is a distance between the moved subject vehicle and the moved object vehicle.

When calculating the position movement information of the subject vehicle and the position movement information of the object vehicle, the apparatus 200 may calculate the distance $\overline{Dist\_2\_Veh}$ between the moved subject vehicle and the moved object vehicle based on the position movement distance $\overline{Dist\_Sub\_Veh}$ of the subject vehicle and the position movement distance $\overline{Dist\_Obj\_Veh}$ of the object vehicle at predetermined time $t_{-3}$, $t_{-2}$, $t_{-1}$, $t_0$, $t_1$, and $t_2$ as the sum of a vector using present horizontal velocity values and present vertical velocity values, present yaw rate values, and present heading angle values sensed by yaw rate sensors, heading angle sensors, and velocity sensors of the subject vehicle and the object vehicle.

As can be seen from a characteristic graph(A) when a distance between vehicles is calculated using the global positioning system 100 and a characteristic graph(B) when a distance between vehicles is calculated using the global positioning system 100 and a dead reckoning formula of FIG. 5, an error rate is reduced from about 20 m to about 5 m.

Hereinafter, a method of calculating a distance between vehicles using the apparatus 200 for calculating the distance between vehicles according to the embodiment of the present invention will be described with reference to FIG. 6.

Figure 6:
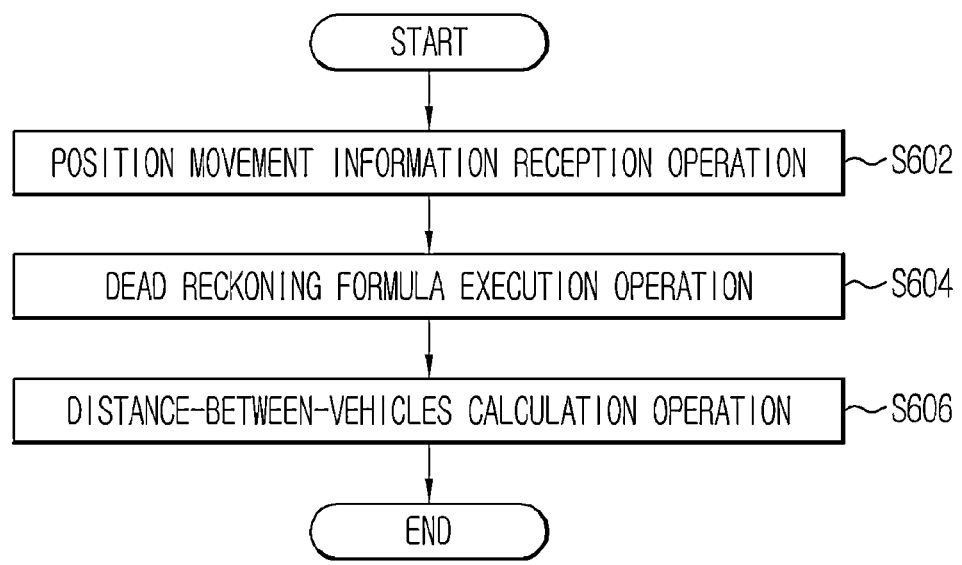
FIG. 6 is a flowchart showing a method for calculating a distance between vehicles according to an embodiment of the present invention.

FIG. 6 is a flowchart showing a method for calculating a distance between vehicles according to an embodiment of the present invention.

Referring to FIG. 6, a method 600 for calculating a distance between vehicles according to an embodiment of the present invention includes a position movement information reception operation (S602), a dead reckoning formula execution operation (S604), and a distance-between-vehicles calculation operation (S606).

First, at the position movement information reception operation (S602), position movement information of a subject vehicle and position movement information of an object vehicle are received from the global positioning system 100 (see FIG. 1).

Subsequently, at the dead reckoning formula execution operation (S604), a predetermined dead reckoning formula including Equation 1 and Equation 2 is executed to calculate the position movement information of the subject vehicle and the position movement information of the object vehicle.

$$\theta = \theta_0 + \int \dot{\theta} dt$$

$$x = x_0 + \int \left(V_x \frac{1}{2} \cos\theta - V_y \sin\theta\right) dt$$

$$y = y_0 + \int \left(V_x \frac{1}{2} \sin\theta + V_y \cos\theta\right) dt$$

⟨Equation 1⟩ where, $\theta_0$ is a yaw rate value at previous time, $\dot{\theta}$ is a yaw rate value at present time, $\theta$ is a yaw rate value at time at which the vehicles have been moved, $x_0$ and $y_0$ are position coordinate values at previous time, and x and y are position coordinate values at time at which the vehicles have been moved.

$$\overline{Dist\_2\_Veh} = -\overline{Dist\_Sub\_Veh} + \overline{Dist\_2\_GPS} + \overline{Dist\_Obj\_Veh}$$

<Equation 2> where, $-\overline{Dist\_Sub\_Veh}$ is a position movement distance of the subject vehicle, $\overline{Dist\_2\_GPS}$ is a distance between the subject vehicle and the object vehicle at previous time, $\overline{Dist\_Obj\_Veh}$ is a position movement distance of the object vehicle, and $\overline{Dist\_2\_Veh}$ is a distance between the moved subject vehicle and the moved object vehicle.

Finally, at the distance-between-vehicles calculation operation (S606), a distance $\overline{Dist\_2\_Veh}$ between the moved subject vehicle and the moved object vehicle based on a position movement distance $\overline{Dist\_Sub\_Veh}$ of the subject vehicle and a position movement distance $\overline{Dist\_Obj\_Veh}$ of the object vehicle at predetermined time $t_{-3}$, $t_{-2}$, $t_{-1}$, $t_0$, $t_1$, and $t_2$ is calculated as the sum of a vector when calculating the position movement information of the subject vehicle and the position movement information of the object vehicle over time using the dead reckoning formula.

When calculating the position movement information of the subject vehicle and the position movement information of the object vehicle at the distance-between-vehicles calculation operation (S606), the distance $\overline{Dist\_2\_Veh}$ between the moved subject vehicle and the moved object vehicle based on the position movement distance $\overline{Dist\_Sub\_Veh}$ of the subject vehicle and the position movement distance $\overline{Dist\_Obj\_Veh}$ of the object vehicle at predetermined time $t_{-3}$, $t_{-2}$, $t_{-1}$, $t_0$, $t_1$, and $t_2$ may be calculated as the sum of a vector using present horizontal velocity values and present vertical velocity values, present yaw rate values, and present heading angle values sensed by yaw rate sensors (not shown), heading angle sensors (not shown), and velocity sensors (not shown) of the subject vehicle and the object vehicle although not shown.

As described above, the apparatus 200 for calculating the distance between vehicles and the method 600 for calculating the distance between vehicles according to the embodiment of the present invention receive the position movement information of the subject vehicle and the position movement information of the object vehicle from the global positioning system 100 and calculate the distance between the subject vehicle and the object vehicle using the dead reckoning formula. When calculating the distance between the subject vehicle and the object vehicle, therefore, an error rate is reduced, thereby preventing collision between the subject vehicle and the object vehicle.

As is apparent from the above description, the apparatus for calculating the distance between vehicles and the method for calculating the distance between vehicles according to the embodiment of the present invention as described above have the following effects.

An error rate is reduced when calculating the distance between the subject vehicle and the object vehicle, thereby preventing collision between the subject vehicle and the object vehicle.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus for calculating a distance between vehicles, the apparatus comprising:
   a processor; and
   a sensor,
   wherein the processor is configured to receive position movement information of a subject vehicle and position movement information of an object vehicle from a global positioning system and to calculate, using values sensed by the sensor, a distance between the moved subject vehicle and the moved object vehicle based on a position movement distance of the subject vehicle and a position movement distance of the object vehicle at a predetermined time as the sum of a vector when calculating the position movement information of the subject vehicle and the position movement information of the object vehicle over time using a dead reckoning formula comprising a yaw rate value at a previous time, a yaw rate value at a present time, a yaw rate value at a time at which the vehicles have been moved, position coordinate values at a previous time, position coordinate values at a time at which the vehicles have been moved, a position movement distance of the subject vehicle, a distance between the subject vehicle and the object vehicle at a previous time, a position movement distance of the object vehicle, and a distance between the moved subject vehicle and the moved object vehicle.

2. The apparatus according to claim 1, wherein, when calculating the position movement information of the subject vehicle and the position movement information of the object vehicle, the apparatus calculates the distance between the moved subject vehicle and the moved object vehicle based on the position movement distance of the subject vehicle and the position movement distance of the object vehicle at the predetermined time as the sum of a vector using present horizontal velocity values and present vertical velocity values, present yaw rate values, and present heading angle values sensed by the sensor which includes yaw rate sensors, heading angle sensors, and velocity sensors of the subject vehicle and the object vehicle.

3. The apparatus according to claim 1, wherein the dead reckoning formula comprises Equation 1 and Equation 2:

$$\theta = \theta_0 + \int \dot{\theta} dt \quad \langle \text{Equation 1} \rangle$$

$$x = x_0 + \int \left( V_x \frac{1}{2} \cos\theta - V_y \sin\theta \right) dt$$

$$y = y_0 + \int \left( V_x \frac{1}{2} \sin\theta + V_y \cos\theta \right) dt$$

where, $\theta_0$ is the yaw rate value at a previous time, $\dot{\theta}$ is the yaw rate value at a present time, $\theta$ is the yaw rate value at a time at which the vehicles have been moved, $x_0$ and $y_0$ are the position coordinate values at a previous time, and x and y are the position coordinate values at a time at which the vehicles have been moved:

$$\overline{\text{Dist\_2\_Veh}} = -\overline{\text{Dist\_Sub\_Veh}} + \overline{\text{Dist\_2\_GPS}} + \overline{\text{Dist\_Obj\_Veh}} \quad <\text{Equation 2}>$$

where, $-\overline{\text{Dist\_Sub\_Veh}}$ is the position movement distance of the subject vehicle, $\overline{\text{Dist\_2\_GPS}}$ is the distance between the subject vehicle and the object vehicle at a previous time, $\overline{\text{Dist\_Obj\_Veh}}$ is the position movement distance of the object vehicle, and $\overline{\text{Dist\_2\_Veh}}$ is the distance between the moved subject vehicle and the moved object vehicle.

4. A method for calculating a distance between vehicles comprising:

receiving position movement information of a subject vehicle and position movement information of an object vehicle from a global positioning system;

executing, using a processor, a predetermined dead reckoning formula comprising a yaw rate value at a previous time, a yaw rate value at a present time, a yaw rate value at a time at which the vehicles have been moved, position coordinate values at a previous time, position coordinate values at a time at which the vehicles have been moved, a position movement distance of the subject vehicle, a distance between the subject vehicle and the object vehicle at a previous time, a position movement distance of the object vehicle, and a distance between the moved subject vehicle and the moved object vehicle to calculate the position movement information of the subject vehicle and the position movement information of the object vehicle; and calculating, using the processor and values sensed by a sensor, a distance between the moved subject vehicle and the moved object vehicle based on a position movement distance of the subject vehicle and a position movement distance of the object vehicle at a predetermined time as the sum of a vector when calculating the position movement information of the subject vehicle and the position movement information of the object vehicle over time using the dead reckoning formula.

5. The method according to claim 4, wherein the calculating the distance between the moved subject vehicle and the moved object vehicle comprises calculating the distance between the moved subject vehicle and the moved object vehicle based on the position movement distance of the subject vehicle and the position movement distance of the object vehicle at the predetermined time as the sum of a vector using present horizontal velocity values and present vertical velocity values, present yaw rate values, and present heading angle values sensed by the sensor which includes yaw rate sensors, heading angle sensors, and velocity sensors of the subject vehicle and the object vehicle.

6. The method according to claim 4, wherein the dead reckoning formula comprises Equation 1 and Equation 2:

$$\theta = \theta_0 + \int \dot{\theta} dt \quad \langle \text{Equation 1} \rangle$$

$$x = x_0 + \int \left( V_x \frac{1}{2} \cos\theta - V_y \sin\theta \right) dt$$

$$y = y_0 + \int \left( V_x \frac{1}{2} \sin\theta + V_y \cos\theta \right) dt$$

where, $\theta_0$ is the yaw rate value at a previous time, $\dot{\theta}$ is the yaw rate value at a present time, $\theta$ is the yaw rate value at a time at which the vehicles have been moved, $x_0$ and $y_0$ are the position coordinate values at a previous time, and x and y are the position coordinate values at a time at which the vehicles have been moved:

$$\overline{\text{Dist\_2\_Veh}} = -\overline{\text{Dist\_Sub\_Veh}} + \overline{\text{Dist\_2\_GPS}} + \overline{\text{Dist\_Obj\_Veh}} \quad <\text{Equation 2}>$$

where, $-\overline{\text{Dist\_Sub\_Veh}}$ is the position movement distance of the subject vehicle, $\overline{\text{Dist\_2\_GPS}}$ is the distance between the subject vehicle and the object vehicle at a previous time, $\overline{\text{Dist\_Obj\_Veh}}$ is the position movement distance of the object vehicle, and $\overline{\text{Dist\_2\_Veh}}$ is the distance between the moved subject vehicle and the moved object vehicle.

* * * * *